(12) United States Patent
Hasegawa et al.

(10) Patent No.: US 11,403,725 B2
(45) Date of Patent: Aug. 2, 2022

(54) INFORMATION PROCESSING APPARATUS AND MOVING VEHICLE SYSTEM

(71) Applicant: TOYOTA JIDOSHA KABUSHIKI KAISHA, Toyota (JP)

(72) Inventors: Hideo Hasegawa, Nagoya (JP); Tadahiro Kashiwai, Nagoya (JP); Yusuke Kaneko, Toyota (JP); Akihiro Yamaguchi, Toyota (JP); Yuki Ito, Iwakura (JP); Naoki Uenoyama, Nisshin (JP); Takahiro Shiga, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 323 days.

(21) Appl. No.: 16/687,827

(22) Filed: Nov. 19, 2019

(65) Prior Publication Data
US 2020/0211144 A1 Jul. 2, 2020

(30) Foreign Application Priority Data

Dec. 28, 2018 (JP) .............................. JP2018-247458

(51) Int. Cl.
*G01C 22/00* (2006.01)
*G05D 1/00* (2006.01)
*G06Q 50/30* (2012.01)

(52) U.S. Cl.
CPC .......... *G06Q 50/30* (2013.01); *G05D 1/0088* (2013.01); *G05D 2201/0212* (2013.01); *G05D 2201/0213* (2013.01)

(58) Field of Classification Search
CPC ................ G06Q 50/30; G05D 1/0088; G05D 2201/0212; G05D 2201/0213

USPC .......................................................... 701/23
See application file for complete search history.

(56) References Cited

U.S. PATENT DOCUMENTS

2018/0129981 A1* 5/2018 Fujimoto ............. G05D 1/0223
2018/0328756 A1* 11/2018 Forutanpour ...... G01C 21/3476
2020/0116510 A1* 4/2020 Hori .................. G01C 21/3484
2021/0073934 A1* 3/2021 Bai ........................ G06Q 10/02

FOREIGN PATENT DOCUMENTS

JP 2013-214167 A 10/2013
JP 2013214167 A * 10/2013

OTHER PUBLICATIONS

English Translation for JP2013214167A (Year: 2021).*

* cited by examiner

*Primary Examiner* — Mahmoud S Ismail
(74) *Attorney, Agent, or Firm* — Oblon, McClelland, Maier & Neustadt, L.L.P.

(57) ABSTRACT

An information processing apparatus manages a ride-sharing system in which a plurality of users travels together on the same moving vehicle. The apparatus includes a control unit configured to calculate a second evaluation value for a user group traveling on the same moving vehicle, based on a first evaluation value based on a user's attribute and a time during which the user group is maintained, and in a case where there is a candidate user who is a candidate of a user newly riding in a predetermined moving vehicle, calculate the second evaluation value when a predetermined user group is formed for the predetermined moving vehicle, and determine a response policy for the candidate user based on whether or not the second evaluation value satisfies a predetermined policy.

8 Claims, 9 Drawing Sheets

FIG. 2
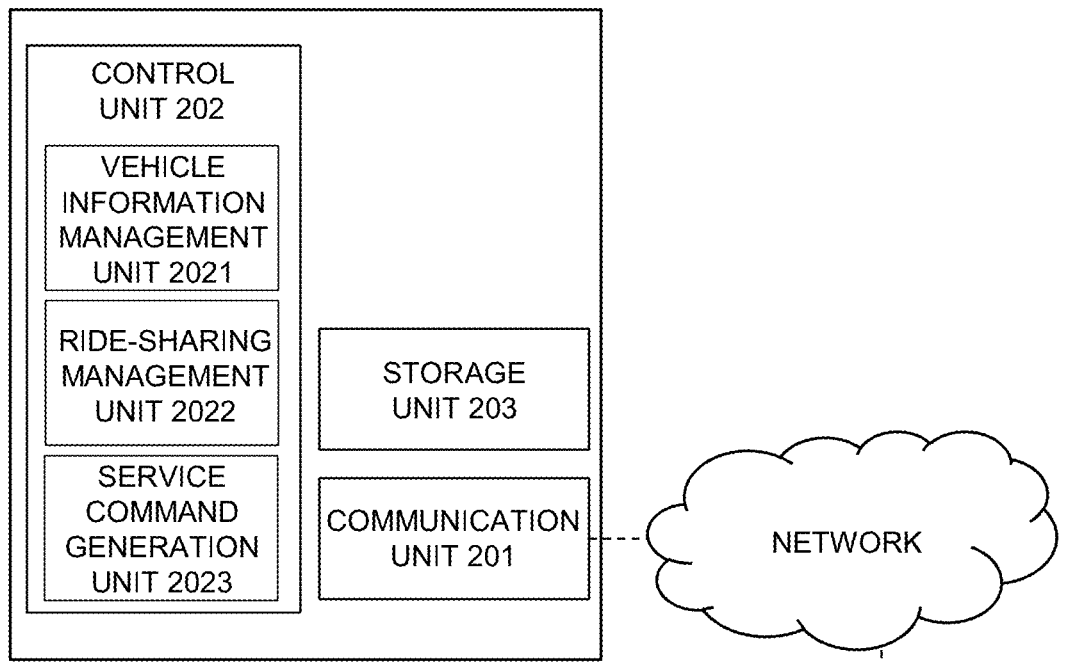
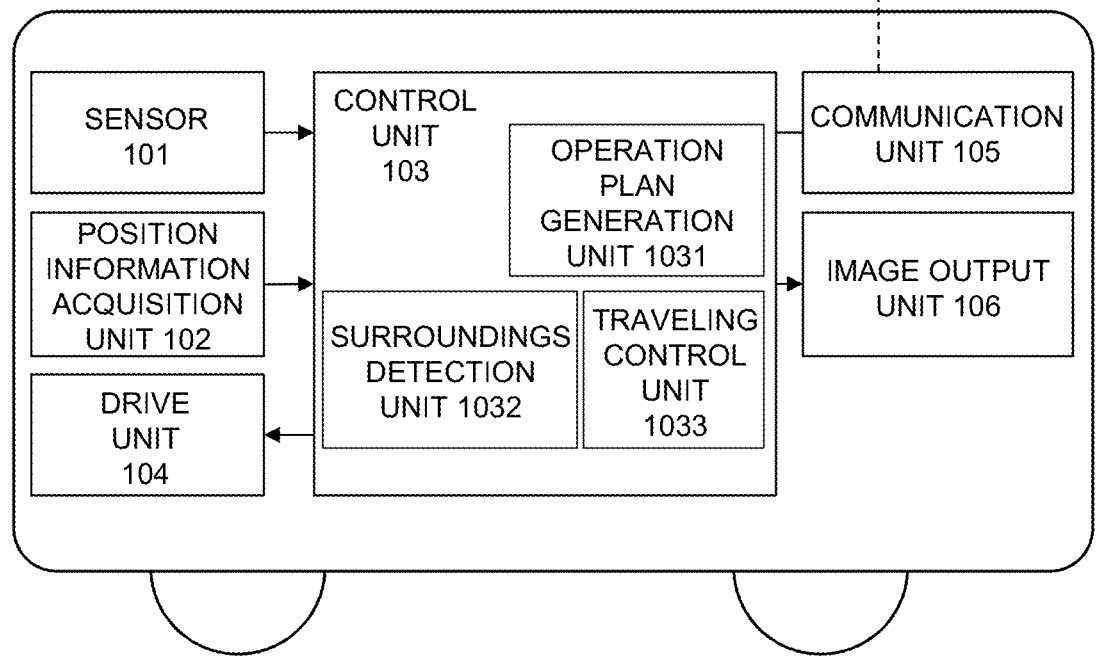

FIG. 5

USER ATTRIBUTE DATA

| USER ID | USER A | USER B | USER C | ... |
|---|---|---|---|---|
| GENDER | MALE | FEMALE | FEMALE | ... |
| AGE | 30S | 20S | 20S | ... |
| LANGUAGE | JAPANESE | JAPANESE | JAPANESE | ... |
| BIRTHPLACE | JAPAN | JAPAN | TAIWAN | ... |
| ... | ... | ... | ... | ... |

INFORMATION PROCESSING APPARATUS AND MOVING VEHICLE SYSTEM

INCORPORATION BY REFERENCE

The disclosure of Japanese Patent Application No. 2018-247458 filed on Dec. 28, 2018 including the specification, drawings and abstract is incorporated herein by reference in its entirety.

BACKGROUND

1. Technical Field

The present disclosure relates to a technology for allowing a plurality of users to travel together on the same vehicle.

2. Description of Related Art

For the purpose of alleviating traffic jams, saving fuel costs, and providing environmental measures, a scheme in which a plurality of users travels together on a single vehicle (ride-sharing) is spreading in other countries. Additionally, a technology for matching a plurality of users for such a model has been developed. As a related technology, JP 2013-214167 A describes a system that performs fee calculations fairly for the plurality of users who travel together on the same vehicle.

SUMMARY

In a case where an unspecified number of users travel together on the same vehicle (carpooling), it is preferable to determine fellow passengers in consideration of the attributes of the plurality of users.

Considering the problem stated above, the present disclosure is made to provide a moving vehicle system taking into account preference in carpooling.

An information processing apparatus according to a first aspect of the present disclosure is an information processing apparatus that manages a ride-sharing system in which a plurality of users travels together on the same moving vehicle, which includes a control unit configured to calculate a second evaluation value for a user group traveling on the same moving vehicle, based on a first evaluation value based on a user's attribute and a time during which the user group is maintained, and in a case where there is a candidate user who is a candidate of a user newly getting on a predetermined moving vehicle, calculate the second evaluation value when a predetermined user group is formed for the predetermined moving vehicle, and determine a response policy for the candidate user based on whether or not the second evaluation value satisfies a predetermined policy.

Moreover, a moving vehicle system according to a second aspect of the present disclosure includes a moving vehicle on which a plurality of users can travel together, and an information processing apparatus configured to manage the moving vehicle, in which the information processing apparatus includes a control unit configured to calculate a second evaluation value for a user group traveling on the same moving vehicle, based on a first evaluation value based on a user's attribute and a time during which the user group is maintained, in a case where there is a candidate user who is a candidate of a user newly getting on a predetermined moving vehicle, calculate the second evaluation value when a predetermined user group is formed for the predetermined moving vehicle, and determine a response policy for the candidate user based on whether or not the second evaluation value satisfies a predetermined policy, and send a service command to the moving vehicle based on the response policy, and in which the moving vehicle includes a second control unit configured to cause the moving vehicle to travel along a travel route based on the service command and to allow a user to get on and off the moving vehicle.

According to a third aspect of the present disclosure, there is provided a program for causing a computer to execute an information processing method executed by the information processing apparatus and the moving vehicle system, or a non-transitory computer-readable storage medium for storing the program.

According to the present disclosure, it is possible to provide a moving vehicle system taking into account preference in carpooling.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 2 is a block diagram schematically showing one example of components provided in the system.

FIG. 5 is a view illustrating user attribute data in the first embodiment.

DETAILED DESCRIPTION OF EMBODIMENTS

Figure 1:
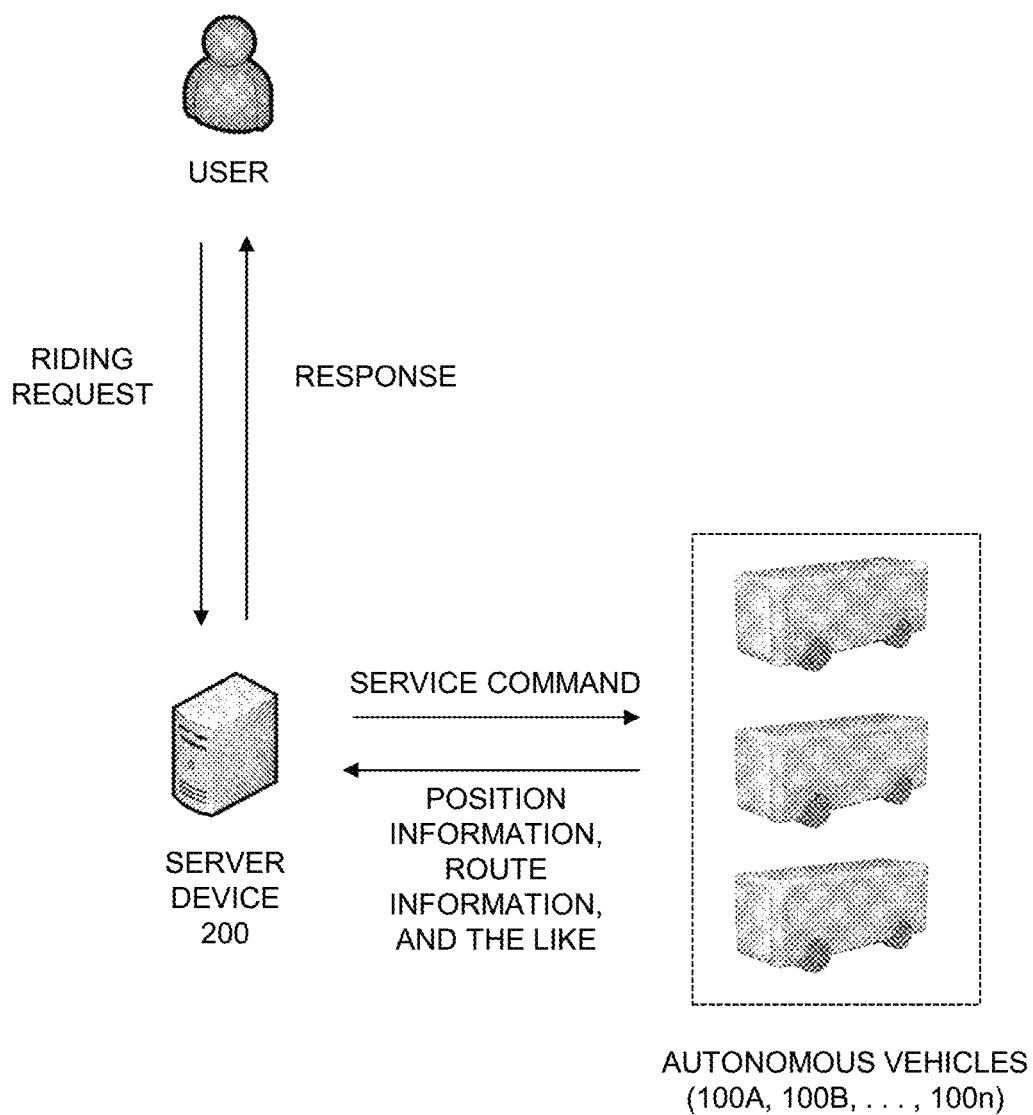
FIG. 1 is a schematic diagram of a moving vehicle system according to a first embodiment.

A moving vehicle system according to an embodiment is a system for implementing a scheme (ride-sharing) in which a plurality of users travels together on the same vehicle. A vehicle (autonomous vehicle) included in the system travels and while getting on and off the plurality of users based on the users' intention.

In such a scheme in which the plurality of users get on the same vehicle, it is preferable to form a set of users who get on the same vehicle in consideration of the user's attributes. For example, when a person who finds a carpool partner is a female, it is preferable for the carpool partner to be female rather than male. On the other hand, in a case in which a matchmaking party (group blind date) is intended to be held for developing deeper relationships between males and females, it is preferable to determine the members to get on the vehicle so that the gender ratio is not biased. However, there is a problem that the conventional technology cannot make an appropriate determination for on-demand ride-sharing in which users frequently change during traveling of a route, unlike general schemes such as ride-sharing for commuters.

For solving such a problem, in the present embodiment, an apparatus for generating a service plan of a moving vehicle (ride-sharing vehicle) calculates a second evaluation value for a user group traveling on the same moving vehicle, based on a first evaluation value based on a user's attribute and a time during which the user group is maintained, and, in a case where there is a candidate user who is a candidate of a user newly getting on a predetermined moving vehicle, calculates the second evaluation value when a predetermined user group is formed for the predetermined moving vehicle, and determines a response policy for the candidate user based on whether or not the second evaluation value satisfies a predetermined policy.

The first evaluation value is an evaluation value representing preference from the viewpoint of user attributes. There are various preference criteria. For example, it may be determined that it is preferable that the plurality of users share similar attributes, or it may be determined that it is preferable that the plurality of users have different attributes. The information processing apparatus according to the present disclosure calculates the second evaluation value (overall evaluation value) by adding the time during which the user group is maintained to the first evaluation value.

Consequently, the preference for the user group can be calculated with high accuracy in the ride-sharing scheme in which the members frequently change.

Further, the control unit may determine candidates of a plurality of response policies each having a different user group for the predetermined moving vehicle, and may determine a response policy to be adopted based on the second evaluation value obtainable in a case where each response policy is employed.

The plurality of response policies are, for example, "picking up a candidate user with the shortest route", "picking up a candidate user after getting on/off the users a predetermined number of times", "picking up a candidate user after passing through a predetermined point", and "not picking up a candidate user." These policies are respectively set for different user groups. The control unit may calculate the second evaluation value for each policy, and may adopt a response policy with the maximum value.

Further, the plurality of response policies may include response policies for any one of the following: (1) a case where a first user group consisting of a plurality of users already getting on the predetermined moving vehicle is maintained; and (2) a case where a second group obtained by adding the candidate user to the plurality of users already getting on the predetermined moving vehicle is formed. That is, a comparison may be made between a case where the candidate user gets on the target moving vehicle and a case where the candidate user does not get on.

Further, the attribute may be a set of a plurality of attribute values, and the control unit may adopt a value obtained by adding results calculated by performing a calculation for each of the attribute values with a predetermined method as the first evaluation value.

Since there are various attributes related to the user, the preference calculation has to be carried out in different ways. For example, the policy may be that "a person with the same mother tongue but different gender is preferred." The preference may be calculated by employing different calculation methods for each attribute and summing the results.

Further, the attribute may include gender information of the user, and the first evaluation value may increase as a gender ratio of the plurality of users riding on the moving vehicle is closer to 1:1. For example, in a case in which the intention is for developing deeper relationships between males and females, it may be preferable that the gender ratio of the plurality of users is closer to 1:1.

First Embodiment

An outline of an information collection system according to the first embodiment will be described with reference to FIG. 1. The information collection system according to the present embodiment includes a plurality of autonomous vehicles 100A, . . . , 100n that autonomously travels based on a given command, and a server device 200 that issues the command. The autonomous vehicle 100 is an automatic driving vehicle that provides a predetermined service, and the server device 200 is a device that manages the plurality of autonomous vehicles 100. Hereinafter, in a case where the plurality of autonomous vehicles are collectively referred to without being individually distinguished, they are simply referred to as a autonomous vehicle 100.

The autonomous vehicle 100 is a multi-purpose moving vehicle that can have functions different for each individual, and is a vehicle capable of autonomous driving and unmanned driving on a road. The autonomous vehicle 100 can be, for example, a pick-up vehicle traveling on a predetermined route, an on-demand taxi operated in response to a user request, a mobile store capable of operating at any destination, or the like. In the present embodiment, the autonomous vehicle 100 is assumed as a carpool vehicle (hereinafter, also referred to as a ride-sharing vehicle) on which the plurality of users can travel. The autonomous vehicle 100 is also referred to as an Electric Vehicle (EV) pallet. In addition, the autonomous vehicle 100 does not necessarily need to be an unmanned vehicle. For example, sales personnel or security personnel may get on the vehicle. Further, the autonomous vehicle 100 does not necessarily need to be a vehicle capable of completely autonomous traveling. For example, the vehicle may be driven or assisted in driving by a person depending on the situation.

The server device 200 is a device that issues the service command to the autonomous vehicle 100. In the present embodiment, when a user who wants to travel sends a riding request to the server device 200, the sever device 200 selects the autonomous vehicle 100 capable of picking up the user based on a getting-on point and a getting-off point (or desired time to get on the vehicle) included in the riding request, generates a travel route of the vehicle, and sends a service command that "there is a person to be transported from the getting-on point to the getting-off point" to the autonomous vehicle 100 that is traveling. Accordingly, the autonomous vehicle 100 can be traveled along a predetermined route. The service command may include a command related to tasks other than traveling. For example, it may include the commands such as "providing guidance to the user getting on the vehicle", "get the user on/off in the middle of the route", and "sending guidance to a terminal owned by the user." As described above, the service command may include operations to be performed by the autonomous vehicle 100 as well as traveling.

In the present embodiment, the server device 200 manages a travel position and a travel route of the autonomous vehicle 100, and processes a riding request sent in real time. When the server device 200 receives a riding request from the user, the server device 200 determines a response policy for the riding request and sends a service command in accordance with the response policy to the autonomous vehicle 100. Furthermore, in the present embodiment, the server device 200 determines the response policy described above in consideration of user attribute data that is information on attributes associated with the user. A specific method for determining the response policy will be described later.

Next, components of the system will be described in detail. FIG. 2 is a block diagram schematically showing one example of a configuration of the autonomous vehicle 100 and the server device 200, which are shown in FIG. 1. The number of the autonomous vehicles 100 may be more than one.

The autonomous vehicle 100 is a vehicle traveling based on the service command acquired from the server device 200. In particular, a travel route is generated based on the service command acquired via wireless communication, and the vehicle travels on a road with an appropriate method while sensing the periphery of the vehicle.

The autonomous vehicle 100 includes a sensor 101, a position information acquisition unit 102, a control unit 103, a drive unit 104, a communication unit 105, and an image output unit 106. The autonomous vehicle 100 operates with electric power supplied from a battery (not shown).

Figure 3:
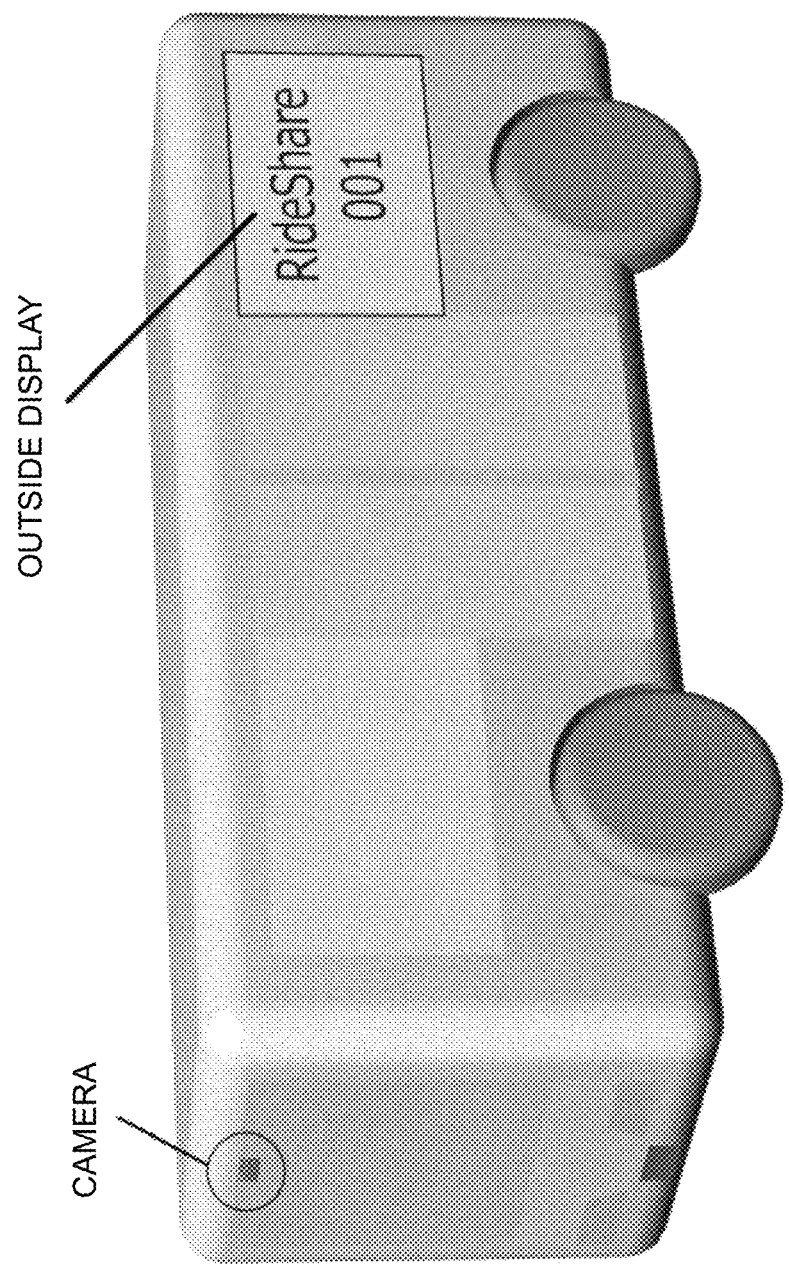
FIG. 3 is a view showing an appearance of a autonomous vehicle 100.

The sensor 101 is a unit configured to detect the periphery of the vehicle, and typically includes a laser scanner, a LIDAR, a radar, and the like. The information acquired by the sensor 101 is sent to the control unit 103. The sensor 101 may also include a camera provided on a body of the autonomous vehicle 100. For example, an image sensor such as charged-coupled devices (CCD), metal-oxide-semiconductor (MOS) or complementary metal-oxide-semiconductor (CMOS) can be used as the sensor 101. As shown in FIG. 3, in the present embodiment, the autonomous vehicle 100 has a camera mounted on the vehicle, and thus images (still images or videos) can be acquired. Although FIG. 3 shows only one camera, a plurality of cameras may be provided at a plurality of positions on the vehicle body. For example, cameras may be installed on the front, rear, and left and right sides of the vehicle, respectively.

The position information acquisition unit 102 is a unit configured to acquire the current position of the vehicle, and typically includes a GPS receiver or the like. The information acquired by the position information acquisition unit 102 is sent to the control unit 103.

The control unit 103 is a computer that controls the autonomous vehicle 100 based on information acquired from the sensor 101. The control unit 103 is configured by a microcomputer, for example.

The control unit 103 includes a operation plan generation unit 1031, a surroundings detection unit 1032, and a traveling control unit 1033 as functional modules. Each functional module may be implemented through executing a program stored in a storage unit such as a read-only memory (ROM) by a central processing unit (CPU) (all not shown).

The operation plan generation unit 1031 acquires the service command from the server device 200 and generates a service plan of the subject vehicle. In the present embodiment, the service plan is data defining a route on which the autonomous vehicle 100 travels and a processing to be performed by the autonomous vehicle 100 over a part or all of the route. Examples of the data contained in the service plan includes the following.

(1) Data representing the route on which the subject vehicle travels with a set of road links The route on which the subject vehicle travels may be automatically generated based on a given starting point and destination with reference to map data stored in a storage unit (not shown), for example. Alternatively, it may be generated using an external service.

(2) Data representing the processing that the subject vehicle should perform at a point on the route Examples of the processing to be performed by the subject vehicle include, but are not limited to, "getting people on and off", "providing guidance to users getting on the vehicle", and "collecting data." The service plan generated the operation plan generation unit 1031 is sent to the traveling control unit 1033 described later.

The surroundings detection unit 1032 detects the surroundings around the vehicle based on the data acquired by the sensor 101. Detection targets include, for example, but are not limited to, the number and positions of lanes, the number and positions of vehicles existing around the subject vehicle, the number and positions of obstacles (for example, pedestrians, bicycles, structures, buildings) existing around the subject vehicle, road structures, road signs, and the like. Any detection target may be available as long as it is necessary for autonomous traveling. Further, the surroundings detection unit 1032 may track the detected object. For example, the relative velocity of the object may be obtained from a difference between a previous coordinate of the object detected one step before and the current coordinate of the object. Data relating to the surroundings (hereinafter referred to as "surroundings data") detected through the surroundings detection unit 1032 is sent to the traveling control unit 1033.

The traveling control unit 1033 controls traveling of the subject vehicle based on the service plan generated by the operation plan generation unit 1031, the surroundings data generated by surroundings detection unit 1032, and the position information of the subject vehicle acquired by the position information acquisition unit 102. For example, the subject vehicle is directed to travel along a predetermined route such that the obstacle does not enter a predetermined safety area centered on the subject vehicle. A well-known method may be employed as a method for autonomous traveling of the vehicle.

The drive unit 104 causes the autonomous vehicle 100 to travel based on the command generated by the traveling control unit 1033. The drive unit 104 includes, for example, a motor an inverter, a brake, a steering mechanism, and a secondary battery that are used to drive the autonomous vehicle 100. The communication unit 105 is a communication unit that connects the autonomous vehicle 100 to a network. In the present embodiment, the communication unit 105 can communicate with other devices (for example, the server device 200) via a network using a mobile communication service such as 3G or LTE. Furthermore, the communication unit 105 may further include a communication tool to communicate with another autonomous vehicles 100.

The image output unit 106 is a unit configured to output images to an outside display provided on the vehicle body. In the present embodiment, the autonomous vehicle 100 has a display outside the vehicle body and can output arbitrary images. The outside display may be a liquid crystal display, or may be configured by an LED matrix, or the like. The image output unit 106 can create images based on data included in the service command or the service plan, and output the created images to the outside display. Accordingly, for example, a mark such as a vehicle number can be shown to a user who is expected to get on the vehicle.

Next, the server device 200 will be described. The server device 200 is a device that manages travel positions and travel routes of the plurality of autonomous vehicles 100, and creates and sends the service commands for the autonomous vehicles 100. For example, in a case where the riding request is received from the user, the server device 200 specifies the getting-on point and the getting-off point, selects the autonomous vehicle 100 that is traveling in the vicinity (i.e. can function as a ride-sharing vehicle), and sends the service command to the selected vehicle.

The server device 200 includes a communication unit 201, a control unit 202, and a storage unit 203. The communication unit 201 is a communication interface to communicate with another autonomous vehicle 100 via the network, similar to the communication unit 105.

The control unit 202 is a unit configured to control the server device 200. The control unit 202 is configured by a CPU, for example. The control unit 202 includes a vehicle information management unit 2021, a ride-sharing management unit 2022, and a service command creation unit 2023 as functional modules. Each functional module may be implemented by executing a program stored in a storage unit such as a ROM by a CPU (all not shown).

The vehicle information management unit 2021 manages the plurality of autonomous vehicles 100 under management. In particular, position information, route information, and event information are received from the plurality of autonomous vehicles 100 at predetermined intervals, and stored in the storage unit 203 (described later) in association with the date and time. The position information is information representing the current position of the autonomous vehicle 100, and the route information is information related to the route on which the autonomous vehicle 100 is scheduled to travel. Moreover, the event information is information regarding an event (for example, getting on/off of the user) which occurs on the autonomous vehicle 100 in service.

Further, the vehicle information management unit 2021 holds and updates the data (hereinafter referred to as "vehicle information") relating to characteristics of the autonomous vehicle 100 as needed. Examples of the vehicle information include, but are not limited to, an identifier, a usage and type of the vehicle, a door type, a vehicle body size, a loading capacity, a maximum passengers capacity, a travelable distance when fully charged, a travelable distance at present, a current status ("standby", "free", "occupied", "traveling", "in service", and the like), of the autonomous vehicle 100.

Figure 4:
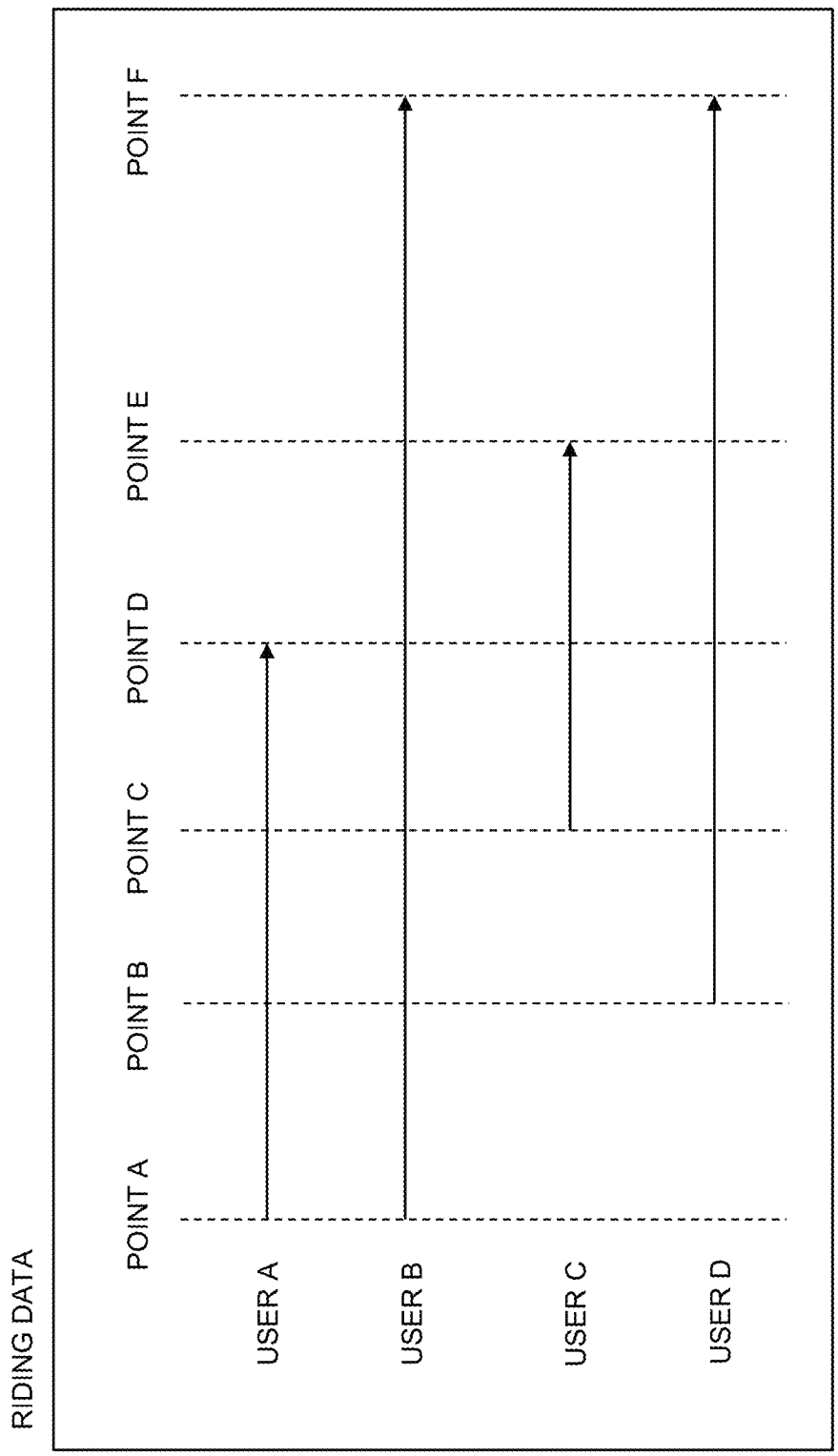
FIG. 4 is a view illustrating riding data in the first embodiment.

The ride-sharing management unit 2022 manages information on the users who get on (or scheduled to get on) the plurality of autonomous vehicles 100. In particular, the ride-sharing management unit 2022 manages information (riding data) on a point where each user gets on and a point where the user gets off the autonomous vehicle 100, as shown in FIG. 4. In the present embodiment, the riding data is data representing the user who gets on the autonomous vehicle 100, and a section and time at which each user gets on. In the example of FIG. 4, the starting point of an arrow represents a point where the user gets on, and the end point of the arrow represents a point where the user gets off. In FIG. 4, the riding data is illustrated with the time information omitted, but the actual riding data preferably includes the time information. The riding data is updated at any time by the ride-sharing management unit 2022 based on information sent from the user or the autonomous vehicle 100 (for example, data indicating that the riding request or the user has gotten on/off the vehicle).

Further, the ride-sharing management unit 2022 stores information (user attribute data) on attributes of the user who uses the system, as shown in FIG. 5. The data may be generated (updated) when the user is registered in the system.

In addition, in a case where the ride-sharing management unit 2022 receives a riding request from a new user, the ride-sharing management unit 2022 determines a response policy for the riding request (whether to accept the riding request, and in a case of accepting, which autonomous vehicle 100 picks up the user at which timing) based on the stored riding data and the user attribute data. A specific method will be described later.

In the present embodiment, the riding request is information including a desired getting-on point, a desired getting-off point, and a desired riding time. The riding request is acquired, for example, from the user via the network or the like. In addition, a source of sending the riding request does not necessarily need to be a general user. For example, a provider which operates the autonomous vehicle 100 may be the source.

The service command generation unit 2023 generates, in a case where a riding request for the ride-sharing vehicle is received from the outside, a service command to be sent to the autonomous vehicle 100 based on a response policy determined by ride-sharing management unit 2022.

The storage unit 203 is a unit configured to store information, which is configured by a storage medium such as a RAM, a magnetic disk, a flash memory or the like.

Next, a processing in which the ride-sharing management unit 2022 determines a response policy in a case where the server device 200 receives the riding request will be described. In the following description, the user who has sent the riding request is referred to as a "riding user."

Calculation of the evaluation value based on the user attribute will be described at first. In the present embodiment, the preference in a case where the plurality of users get on a single vehicle is calculated based on the attributes of each user according to a preset rule. Herein, four attributes of "gender", "age", "language", and "birthplace" will be described as examples of the user attributes.

In a case where a ride-sharing vehicle is in service, it is preferable that the users who get on the vehicle have the same gender, or alternatively, the gender ratio of the users is 1:1. A first evaluation function $f_1$ will be demonstrated. The first evaluation function $f_1$ is function that returns the preference when a gender list is given as an argument. The first evaluation function $f_1$ returns a higher value as the gender ratio is not biased (that is, a value is higher as the gender ratio is closer to 1:1, provided that the highest value is returned when there is no person of either gender).

In a case where a ride-sharing vehicle is in service, it is preferable that the users who get on the vehicle are around the same age, or share a similar language or birthplace. A second evaluation function $f_2$ will be demonstrated. The second evaluation function $f_2$ is function that returns the preference when lists of age, language, and birthplace are given as arguments. The second evaluation function $f_2$ returns a higher value as values are not biased.

The preference for the vehicle that the plurality of users get on may be calculated by summing the results of evaluating the gender ratio with the evaluation function $f_1$ and the results of evaluating the age, language, and birthplace with the evaluation function $f_2$.

The value thus calculated (hereinafter referred to as "attribute evaluation value") represents the preference at a temporary point. However, in the on-demand ride-sharing scheme, the time for each user to get on the vehicle is different from each other, thus it is not appropriate to evaluate the overall preference with the attribute evaluation value at a temporary point.

Therefore, in the present embodiment, a comprehensive evaluation value (hereinafter referred to as a "comprehensive evaluation value") is calculated by adding "a time during which the plurality of users travel together" to the calculated attribute evaluation value. The response policy for the user who has sent the riding request is determined based on the comprehensive evaluation value. In other words, the longer the "preferred state" based on the user's attributes continues, the more preferable it is evaluated as.

Figure 6:
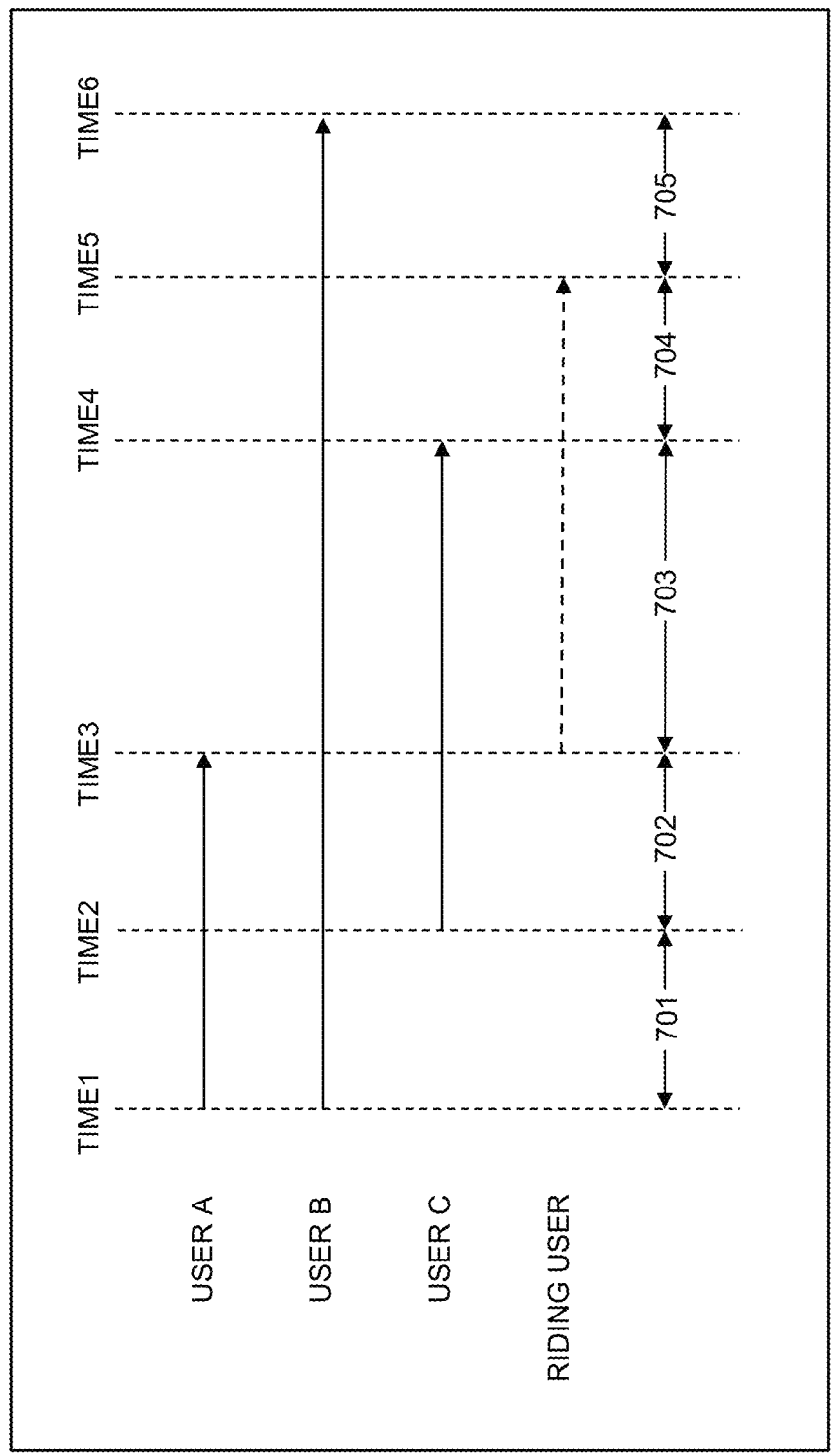
FIG. 6 is a time chart showing a time when a plurality of users respectively gets on a vehicle.

FIG. 6 is a time chart showing a time when the plurality of users respectively get on the ride-sharing vehicle. The comprehensive evaluation value between Times 1 and 2 can be calculated by adding a length of a period 701 to the attribute evaluation value calculated on the basis of the attributes of the users A and B. The comprehensive evaluation value between Times 2 and 3 can be calculated by adding a length of a period 702 to the attribute evaluation value calculated on the basis of the attributes of the users A, B, and C. The same applies to evaluation values between Times 3 and 4, 4 and 5, and 5 and 6, respectively. In a case where it is desired to calculate the comprehensive evaluation value for successive time steps, the values calculated for each of the periods may be integrated. Additionally, in a case where the riding user newly gets on the vehicle, the evaluation may be performed on a user group in which the riding user is added to a plurality of users who has already gotten on the vehicle.

The ride-sharing management unit 2022 generates a plurality of response policies when the riding request is received from the riding user, performs the calculation (described above) of the comprehensive evaluation value for all the response policies, and adopts a response policy with the highest evaluation value. For example, in a case where the riding user is picked up according to the certain response policy, a riding time zone (indicated by a dashed line in FIG. 6) of the riding user is determined, and the comprehensive evaluation value in a predetermined range (for example, Times 1 to 6) is calculated by the method described above. In addition, the range in which the comprehensive evaluation value is calculated can be set randomly. For example, the range may be set to be "from the current time to a time when the riding user gets off", or "until n minutes later from the current time."

Figure 7:
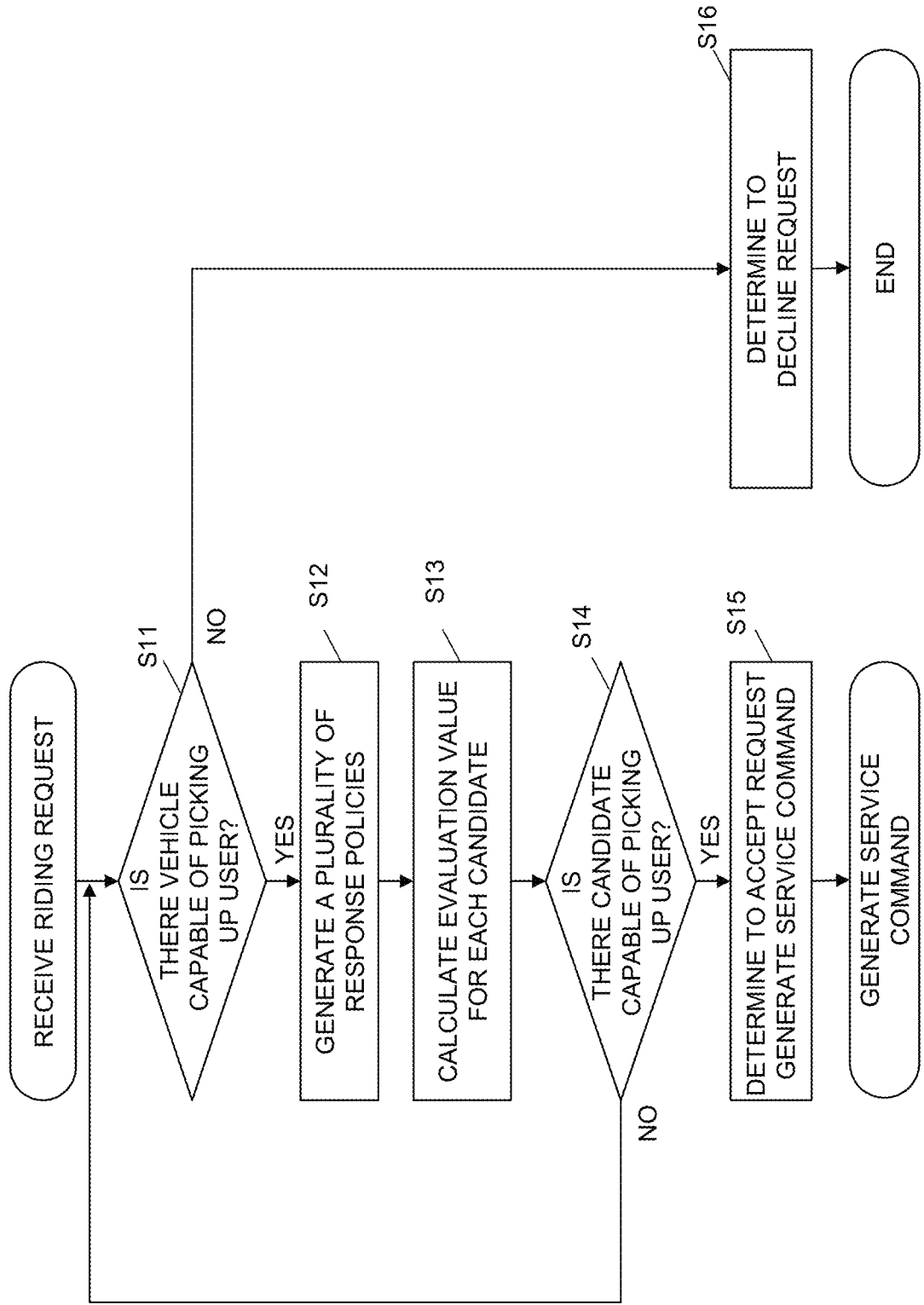
FIG. 7 is a flowchart illustrating processing executed by a server device of the first embodiment.

A specific flow will be described. When the riding user sends a riding request, the server device 200 (ride-sharing management unit 2022) acquires the riding request, and acquires a desired getting-on point, a desired getting-off point, and a desired riding time. FIG. 7 is a flowchart illustrating processing executed in a case where the ride-sharing management unit 2022 acquires the riding request.

First, in step S11, the position information and the route information of the ride-sharing vehicle, which are managed by the vehicle information management unit 2021, are referred to determine whether or not there is a ride-sharing vehicle that is capable of responding to the riding request. In this step, for example, it is determined whether or not there is a ride-sharing vehicle that is capable of responding to the riding request based on the following criteria.

(1) Whether or not a vehicle can pick up the user within a predetermined time range including the desired riding time.

This is because in a case where a vehicle has a travel schedule that does not match the riding user, such a vehicle is not suitable as a ride-sharing vehicle.

(2) How close a vehicle gets to the getting-on and getting-off points. For example, in a case where another user has already gotten on a ride-sharing vehicle and a travel route of such a vehicle has already been determined, but a significant departure from the route to pick up the riding user, other users will be affected.

In a case where it is determined as "YES" in step S11, one of the ride-sharing vehicles that is capable of picking up the riding user is selected (for example, the vehicle closer to the riding user is preferentially selected), and a plurality of candidates for the response policy is generated for the selected vehicle. The response policy can be determined, for example, by the following method (step S12).

(1) The riding request is responded by a method that minimizes service costs.

For example, in a case where the travel route of the target ride-sharing vehicle has already been determined, the user is picked up by a route that minimizes departure from the original route.

(2) The riding request is responded by a method for adjusting the time when the users get on and off the vehicle.

For example, in a case where the getting-off point of the fellow passenger is near to the desired getting-on point, priority is given to the passenger who wants to get off, and then the riding user is picked up. As stated above, the passenger's schedule may be prioritized. Alternatively, in a case where there are two or more riding users, the respective timing at which each user gets on the vehicle may be switched. For example, the riding user who has made a reservation earlier may be picked up first (regardless of the distance).

(3) The riding request is declined.

A response policy to decline the request can also be generated. Further, in a case where a plurality of riding requests is received from a plurality of riding users at the same time, all possible patterns may be generated.

Next, in step S13, the comprehensive evaluation value is calculated for each of the plurality of response policies by the method described with reference to FIG. 6. In step S14, it is determined whether or not there is a response policy that the riding request can be accepted (that is, the riding user can get on the vehicle). In particular, the comprehensive evaluation value calculated for each response policy is compared with a predetermined threshold value, and a response policy of which the evaluation value exceeds the threshold value is selected. In a case where there is no response policy of which the evaluation value exceeds the threshold value, it is determined as "NO" in step S14. Further, in a case where the only remaining response policy is that the riding request is declined, it is also determined as "NO" in step S14.

In a case where it is determined as "NO" in step S14, the processing returns to step S11 to examine other ride-sharing vehicles. As a result, in a case where there is no ride-sharing vehicle that can pick up the user, the processing proceeds to step S16, and it is determined that the riding request is not accepted. In a case where it is determined as "YES" in step S14, the processing proceeds to step S15 and determines that the riding request is accepted. In this case, the determined response policy is sent from the ride-sharing management unit 2022 to the service command generation unit 2023, and a service command for picking up the riding user is generated.

Figure 8:
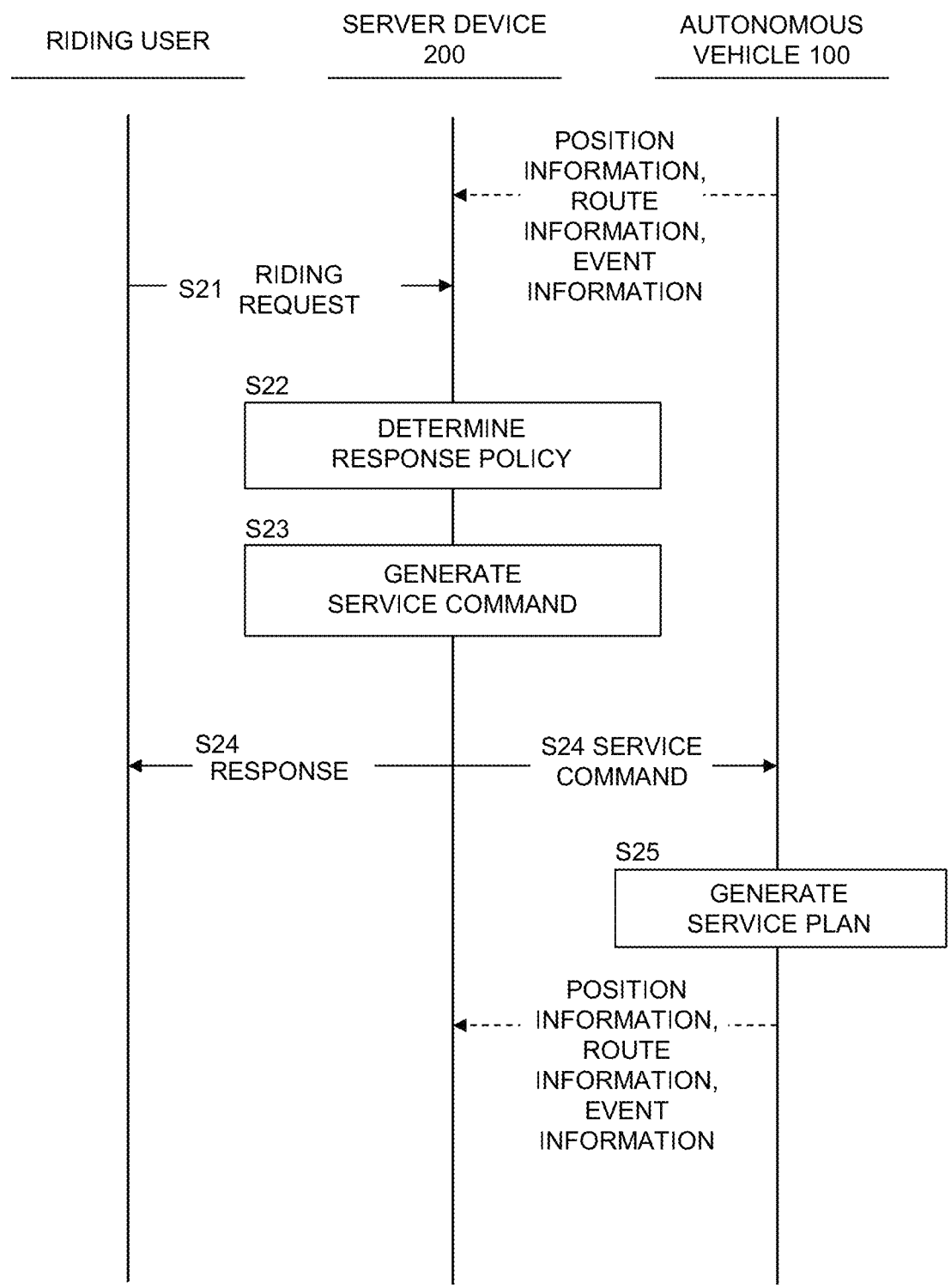
FIG. 8 is a flowchart showing a data flow between components of the system.

Next, processing performed by each component constituting the system will be described. FIG. 8 is a diagram illustrating a data flow from when the server device 200 generates the service command based on the riding request sent by the user to when the autonomous vehicle 100 starts a service.

The autonomous vehicle 100 periodically sends the position information, the route information and the event information to the server device 200. Further, the position information and the route information are sent every time as time elapses. The event information is sent with occurrence of the event (for example, the user's getting-on/off) as a trigger. The vehicle information management unit 2021 receiving these pieces of information, causes the storage unit 203 to store the received information in association with the identifier of the autonomous vehicle 100. Moreover, the position information is not necessarily the position information of the node itself. For example, the position information may be information for specifying a node or a link. Further, the link may be divided into a plurality of sections. Moreover, the road network does not necessarily have to be represented by nodes and links.

When the user sends a riding request to the server device 200 (step S21), the server device 200 (ride-sharing management unit 2022) generates a response policy by the method described above (step S22), based on the riding request, the riding data, and the user attribute data stored in the storage unit. The service command generation unit 2023 generates a service command based on the response policy (step S23). The service command includes, for example, information on the riding user, a point where the user gets on, and a point where the user gets off the autonomous vehicle 100. In step S24, the service command generation unit 2023 sends the service command to the target autonomous vehicle 100. In addition, the ride-sharing management unit 2022 sends to the riding user a response including whether or not the riding request is accepted, a position where the user gets on the vehicle, a position where the user gets off the vehicle, an estimated arrival time, and the like.

In step S25, the autonomous vehicle 100 (operation plan generation unit 1031) generates a service plan based on the received service command. For example, in a case where the autonomous vehicle 100 is not in service, the service plan is generated in which the riding user will be picked up at a predetermined getting-on point and will get off at a predetermined getting-off point. Further, in a case where the autonomous vehicle 100 is in service, the service plan that is already determined is corrected so that the riding user can be picked up and get off. The generated or corrected service plan is sent to the traveling control unit 1033.

As described above, the moving vehicle system according to the present embodiment calculates the preference for the user group based on the user's attributes and the time during which the user group is maintained. Accordingly, the overall preference can also be evaluated in the ride-sharing scheme in which the members frequently change.

Second Embodiment

In the first embodiment, the riding user sends a riding request to the server device 200, and the server device 200 determines the response policy in response to such a request. Meanwhile, in the second embodiment, a potential user is registered in the server device 200 in advance. In a case where an evaluation value of a certain ride-sharing vehicle falls below a threshold value, the potential user is asked whether he/she will get on such a vehicle or not. The second embodiment can be suitably applied to the event intended for developing deeper relationships between the users using the ride-sharing vehicle.

Figure 9:
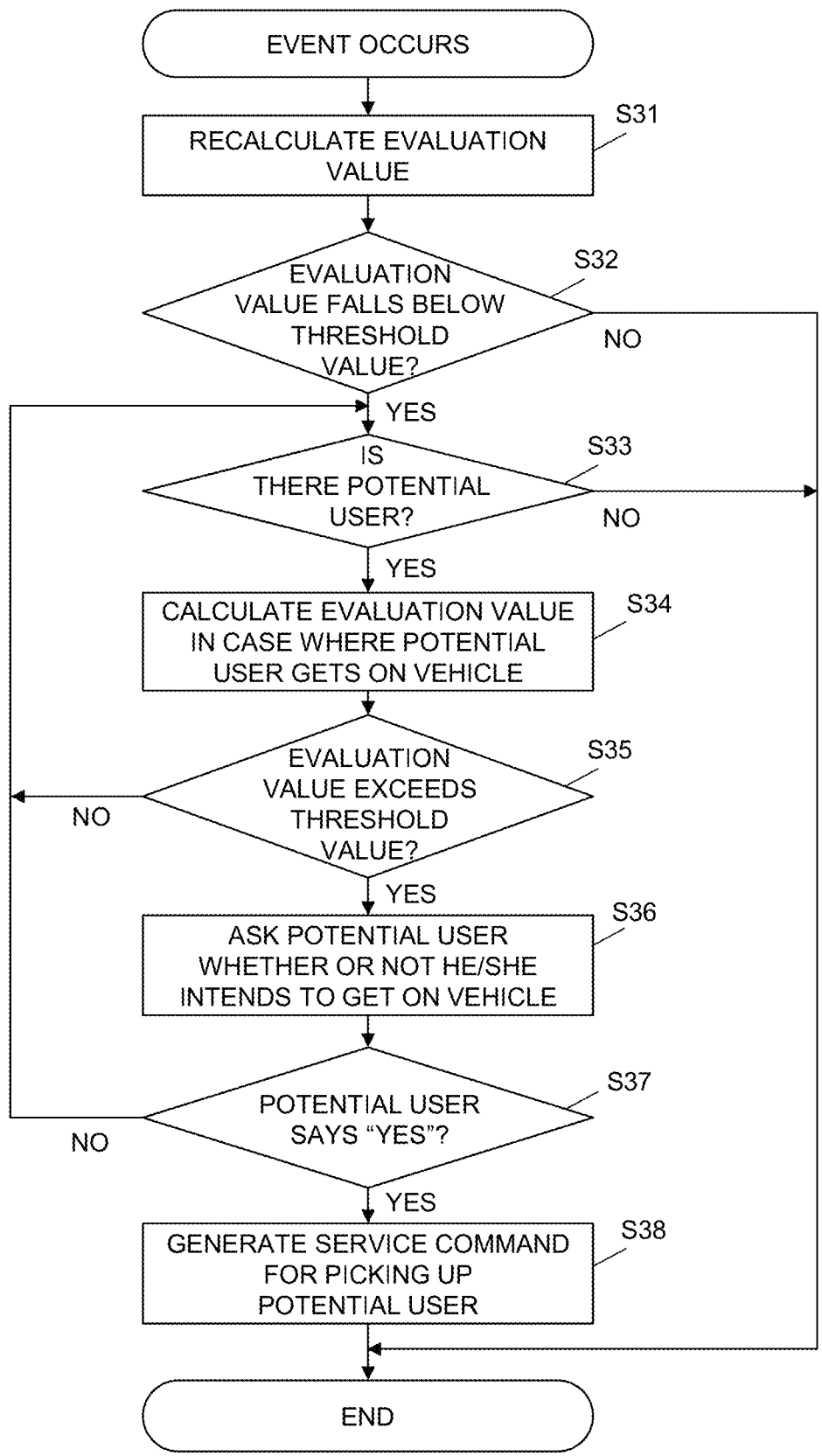
FIG. 9 is a flowchart illustrating processing executed by a server device of a second embodiment.

FIG. 9 is a flowchart illustrating processing executed by the server device 200 (ride-sharing management unit 2022) of the second embodiment. This processing is executed at the timing when an event (typically, the user gets off the vehicle) occurs for a certain ride-sharing vehicle.

First, in step S31, a comprehensive evaluation value after the event occurs (e.g. after the user gets off the vehicle) is recalculated for the target ride-sharing vehicle. In a case where calculated comprehensive evaluation value falls below a predetermined threshold (step S32: YES), the processing proceeds to step S33 to determine whether there is a potential user or not.

The potential user is a user who has indicated in advance his/her intention to possibly use the ride-sharing vehicle. Information on the potential user (user ID, position, or area where the user can get on and off, time zone when the user can get on, and the like) is registered in advance in the ride-sharing management unit 2022. In step S33, for example, the potential user, who is present in the vicinity (within a predetermined range) of the target ride-sharing vehicle and can get on within a predetermined time, is extracted. In a case where the potential user is present, the processing proceeds to step S34 and the comprehensive evaluation value in a case where the potential user gets on the vehicle is calculated. As a result, in a case where the comprehensive evaluation value exceeds a predetermined threshold (step S35: YES), the potential user is asked whether he/she will get on such a vehicle or not (step S36). For example, a message is sent to a terminal associated with the potential user, and a response is requested.

In a case where the potential user says "YES" (step S37: YES), the service command generation unit 2023 generates a service command for picking up the potential user, and the generated service command is sent to the corresponding autonomous vehicle 100. In a case where the potential user says "NO" (step S37: NO), or in a case where the comprehensive evaluation value does not exceed the threshold value even if the potential user gets on the vehicle (step S35: NO), the processing returns to step S33, and other potential users are selected.

As described above, according to the second embodiment, it is possible to take measures for increasing the evaluation value when the comprehensive evaluation value for the ride-sharing vehicle decreases with the user getting on and off the vehicle.

For example, when the gender ratio is biased in an event intended for developing deeper relationships between males and females, it can be corrected by this embodiment.

MODIFIED EXAMPLES

The embodiments stated above are mere examples, and the present disclosure can be implemented with appropriate modifications within a scope not departing from the gist thereof. For example, the processing and units described in the present disclosure can be freely combined and implemented unless technical contradiction occurs.

Further, the processing described as being performed by a single device may be executed in a shared manner by a plurality of devices. Alternatively, the processing described as being performed by different devices may be executed by a single device. In the computer system, the hardware configuration (server configuration) for implementing each function can be flexibly changed.

The present disclosure can also be implemented by supplying a computer program for executing the functions described in the embodiments by a computer, and reading and executing the program by one or more processors included in the computer. Such a computer program may be provided to the computer by a non-transitory computer-readable storage medium connectable to a computer system bus, or may be provided to the computer via a network.

Examples of the non-transitory computer-readable storage media include a random disk (such as a magnetic disk (floppy (registered trademark) disk, hard disk drive (HDD)) or an optical disk (CD-ROM, DVD disk, Blu-ray disk)), read-only memory (ROM), random access memory (RAM), EPROM, EEPROM, magnetic card, flash memory, optical card, and random type of medium suitable for storing electronic instructions.

What is claimed is:

1. An information processing apparatus that manages a ride-sharing system, the information processing apparatus comprising:
at least one processor configured to:
calculate a second evaluation value for a user group including a plurality of users traveling on a same moving vehicle based on:
a first evaluation value determined based on an attribute of the plurality of users and
a time during which the plurality of users travel together;
in a case where there is a candidate user who is a candidate of a user newly getting on the moving vehicle;
calculate the second evaluation value for a predetermined user group when the predetermined user group is formed for the moving vehicle, and
determine a response policy for the candidate user based on whether or not the second evaluation value satisfies a predetermined policy; and
send a service command to the moving vehicle for causing the moving vehicle to travel along a travel route based on the response policy.

2. The information processing apparatus according to claim 1, wherein the at least one processor is configured to:
determine candidates of a plurality of response policies each having a different user group for the moving vehicle, and
determine one of the plurality of response policies to be adopted based on the second evaluation value obtained when each of the plurality of response policies is employed.

3. The information processing apparatus according to claim 2, wherein the plurality of response policies include response policies for any one of the following:
(i) a case where a first user group consisting of multiple users already getting on the moving vehicle is maintained; and
(ii) a case where a second group obtained by adding the candidate user to the multiple users already getting on the moving vehicle is formed.

4. The information processing apparatus according to claim 1, wherein:
the attribute is a set of a plurality of attribute values; and
the at least one processor is configured to adopt a value obtained by adding results of calculations performed on each of the attribute values with a predetermined method as the first evaluation value.

5. The information processing apparatus according to claim 1, wherein:
the attribute includes information on a gender of a user, and
the first evaluation value increases as a gender ratio of the plurality of users getting on the moving vehicle is closer to 1:1.

6. The information processing apparatus according to claim 1, wherein the at least one processor is configured to calculate the second evaluation value by adding the time during which the plurality of users travel together.

7. The information processing apparatus according to claim 1, wherein the at least one processor is configured to calculate the second evaluation value such that the second evaluation value increases as the first evaluation value increases and the time during which the plurality of users travel together increases.

8. A moving vehicle system, comprising:
a moving vehicle on which a plurality of users can travel together; and
an information processing apparatus configured to manage the moving vehicle,
wherein the information processing apparatus includes at least one processor configured to:
calculate a second evaluation value for a user group including the plurality of users traveling on the same moving vehicle based on:
a first evaluation value determined based on an attribute of the plurality of users, and
a time during which the plurality of users travel together;
in a case where there is a candidate user who is a candidate of a user newly getting on the moving vehicle:
calculate the second evaluation value for a predetermined user group when the predetermined user group is formed for the moving vehicle, and
determine a response policy for the candidate user based on whether or not the second evaluation value satisfies a predetermined policy; and
send a service command to the moving vehicle based on the response policy, and
wherein the moving vehicle includes at least one processor configured to:
cause the moving vehicle to travel along a travel route based on the service command; and
allow a user to get on and off the moving vehicle.

* * * * *